(12) United States Patent
Mesiti

(10) Patent No.: US 11,129,513 B2
(45) Date of Patent: Sep. 28, 2021

(54) SCRUB GLOVE FOR CLEANING VARIOUS ARTICLES

(71) Applicant: Nathan Mesiti, Belleville, IL (US)

(72) Inventor: Nathan Mesiti, Belleville, IL (US)

( * ) Notice: Subject to any disclaimer, the term of this patent is extended or adjusted under 35 U.S.C. 154(b) by 171 days.

(21) Appl. No.: 16/143,604

(22) Filed: Sep. 27, 2018

(65) Prior Publication Data

US 2019/0021571 A1 Jan. 24, 2019

Related U.S. Application Data

(63) Continuation-in-part of application No. 14/946,958, filed on Nov. 20, 2015, now abandoned.

(51) Int. Cl.
*A47L 13/18* (2006.01)
*A46B 5/04* (2006.01)
*B08B 1/00* (2006.01)

(52) U.S. Cl.
CPC ............... *A47L 13/18* (2013.01); *A46B 5/04* (2013.01); *B08B 1/00* (2013.01)

(58) Field of Classification Search
CPC .............. A47L 13/18; A46B 5/04; B08B 1/00
See application file for complete search history.

(56) References Cited

U.S. PATENT DOCUMENTS

| | | | |
|---|---|---|---|
| 5,024,594 A * | 6/1991 | Athayde | ............... A62B 17/00 442/67 |
| 6,000,060 A | 12/1999 | Borucki-Mastej | |
| 6,016,571 A | 1/2000 | Guzman et al. | |
| 6,192,543 B1 | 2/2001 | Lee | |
| 6,292,948 B1 * | 9/2001 | Chen | ......................... A47K 7/02 15/227 |
| 6,513,998 B1 | 2/2003 | Barry | |
| 2002/0017310 A1 * | 2/2002 | Gruenbacher | .......... A47L 13/18 132/320 |
| 2005/0177965 A1 | 8/2005 | Edoh | |
| 2005/0193515 A1 * | 9/2005 | Chang | ...................... A47K 7/02 15/227 |

(Continued)

FOREIGN PATENT DOCUMENTS

| | | | |
|---|---|---|---|
| JP | H07284467 A | 10/1995 | |
| KR | 10-0981761 B1 * | 9/2010 | ............. A41D 19/00 |

(Continued)

OTHER PUBLICATIONS

International Search Report, International Patent Application No. PCT/US2019/032003, dated Aug. 26, 2019 (9 pages).

*Primary Examiner* — Weilun Lo
(74) *Attorney, Agent, or Firm* — Lewis Rice LLC

(57) ABSTRACT

A scrub glove (G') has an inner layer (IL) fitting over a wearer' thumb, fingers, palm, and back of their hand, the wearer's wrist and a portion of their forearm. The glove further has an outer layer (OL) of an abrasive, woven mesh material formed to fit over the inner layer and enclosing the wearer's thumb, fingers, palm, the back of their hand, and their wrist. A band (D) fits over an open end of the outer layer where it fits over the open end and a cuff portion of the inner layer and is permanently secured to both the inner and outer layers. While the outer layer fits over the inner layer, it does not adhere to the inner layer whereby when the glove is used fin cleaning, the outer layer is free to move separately from the inner layer.

5 Claims, 6 Drawing Sheets

(56) References Cited

U.S. PATENT DOCUMENTS

| | | |
|---|---|---|
| 2006/0148390 A1 | 7/2006 | Woo et al. |
| 2008/0178366 A1 | 7/2008 | Daher |
| 2008/0244848 A1 | 10/2008 | Firouzman |
| 2009/0249573 A1 | 10/2009 | Ruiz |
| 2010/0218326 A1* | 9/2010 | Yamaguchi ............. A47L 13/18 |
| | | 15/227 |
| 2011/0004974 A1 | 1/2011 | Firouzman |
| 2011/0131742 A1 | 6/2011 | Cheung |
| 2011/0167581 A1 | 7/2011 | Arzarzar |
| 2011/0252586 A1 | 10/2011 | Schouten et al. |
| 2011/0258755 A1 | 10/2011 | Arfi |
| 2012/0210532 A1 | 8/2012 | Slade, Jr. |
| 2014/0157539 A1 | 6/2014 | Megerdichian |
| 2015/0289728 A1* | 10/2015 | Penaz .................... A61Q 19/10 |
| | | 134/6 |
| 2017/0143178 A1 | 5/2017 | Mesiti |

FOREIGN PATENT DOCUMENTS

| | | |
|---|---|---|
| KR | 100981761 B1 | 9/2010 |
| WO | 2010107297 A2 | 9/2010 |

* cited by examiner

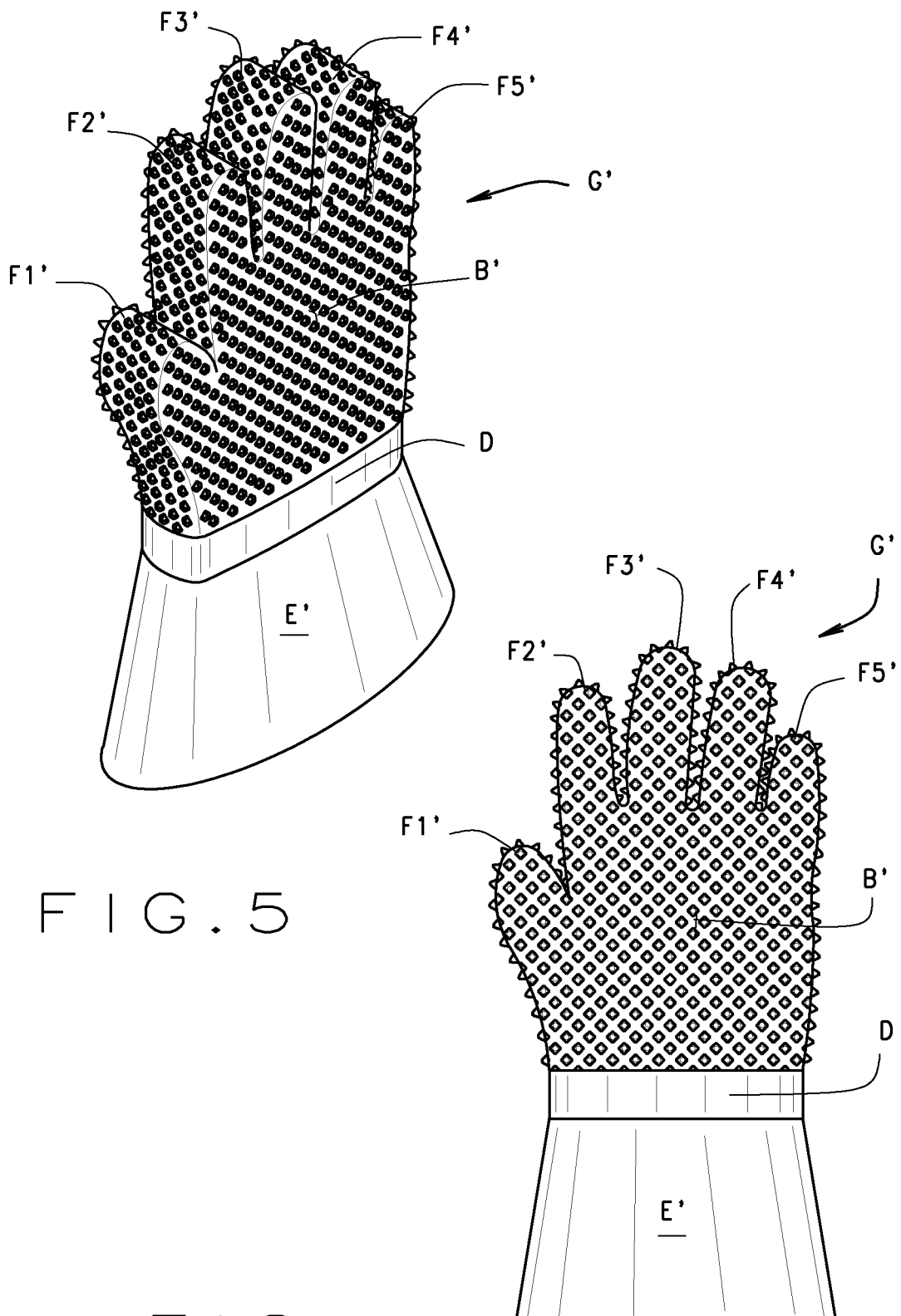

SCRUB GLOVE FOR CLEANING VARIOUS ARTICLES

CROSS REFERENCE TO RELATED APPLICATIONS

This Application is a continuation-in-part of non-provisional patent application Ser. No. 14/946,958 filed Nov. 20, 2015 which is incorporated herein by reference.

STATEMENT REGARDING FEDERALLY SPONSORED RESEARCH OR DEVELOPMENT

N/A

BACKGROUND OF THE INVENTION

This invention relates to cleaning a variety of surfaces including smooth, rough, and bumpy surfaces; and, in particular, to an ergonomic scrubbing glove worn by one cleaning the surfaces so to achieve cleaner surfaces than are achieved using conventional cleaning methods.

Cleaning surfaces whether in the kitchen, bathroom, or other rooms in the house, lawn furniture, exterior windows, siding, gutters on the outside of the house, and automotive vehicles is an unpleasant task at best. The different cleansers that have to be used attack a person's skin and are smelly. There also never seems to be enough rags or wash cloths to do the job, and most times doing the job not only takes longer than one would like, but often the results are not what the person doing the cleaning desires. Further, people with arthritis or other crippling conditions often encounter significant difficulty in trying to clean their homes using conventional cleaning equipment and techniques.

Heretofore, there has never been a simple, easy-to-use, and low cost cleaning utensil that not only achieves a good result, but also significantly shortens the amount of time required to do the job right so that the person doing the cleaning feels they have actually accomplished something. Further, conventional scrubbing and scouring utensils often require a person to grasp an object being cleaned thereby restricting the person's ergonomic capability and full functionality of their hand.

The present invention provides a significant improvement in the way cleaning both inside and outside the house is done with results that the person doing the cleaning desires.

BRIEF SUMMARY OF THE INVENTION

The present invention is directed to a simple, easy-to-use, and low cost cleaning utensil that is ergonomically efficient and provides a thorough cleaning while significantly reducing the amount of time and bother required to clean.

The utensil comprises a scrub glove worn by a person doing the cleaning and allows the person to expeditiously and thoroughly clean dirty surfaces whether smooth, rough, or bumpy. The glove is made of rubber or a similar liquid impervious material with a layer of an abrasive woven mesh material encasing the fingers, palm, and back of the glove wearer's hand. The rubber, base portion of the glove has a cuff extending sufficiently far up a wearer's wrist and forearm that they do not come in contact with any cleaning solutions with which the glove is used. The scrub glove covers the entirety of the wearer's hand and allows the wearer to intricately move their hand freely over and about an object being cleaned. The ergonomic scrub glove allows its wearer to conform their hand to the shape and surface of an object being cleaned and allows the wearer to apply the level of pressure required to achieve a desired cleaning result. The scrub glove provides the wearer greater control over their cleaning movements and promotes a greater efficiency in cleaning an object regardless of how detailed the surfaces of the object are.

As such, the scrub glove provides an ergonomic solution to cleaning an object; and, in particular, often relieves the wearer of having to grasp the object being cleaned. This is particularly advantageous for persons with arthritis or other conditions which make it difficult for persons to use conventional cleaning equipment and techniques.

The glove is available in pairs so for use by right-handed or left-handed persons.

The outer layer of the glove can be wetted or saturated with a wide variety of commercial over-the-counter cleansers. A cleansing material is poured onto or over the fingers and palm of the glove with the user then scrubbing a desired surface using their fingers and palm. During a cleaning, the wearer either rubs their fingers and palm over the surface to be cleaned as well as into crevices or hard to reach places where dirt, grime, mold, etc., have accumulated.

The glove is easy to clean after use by hand rinsing in a soap solution, or by placing it in a dishwasher. When worn out, the glove is readily replaced with a new glove.

Other objects and features will be in part apparent and in part pointed out hereinafter.

BRIEF DESCRIPTION OF THE SEVERAL VIEWS OF THE DRAWINGS

The accompanying figures, together with detailed description which follows, form part of the specification and illustrate the various embodiments described in the specification.

FIG. 5 is a perspective view of a second embodiment of the scrub glove;

FIG. 6 is a plan view of the scrub glove viewed from the back of a wearer's hand;

Corresponding reference characters indicate corresponding parts throughout the several views of the drawings.

DETAILED DESCRIPTION OF INVENTION

Figure 1:
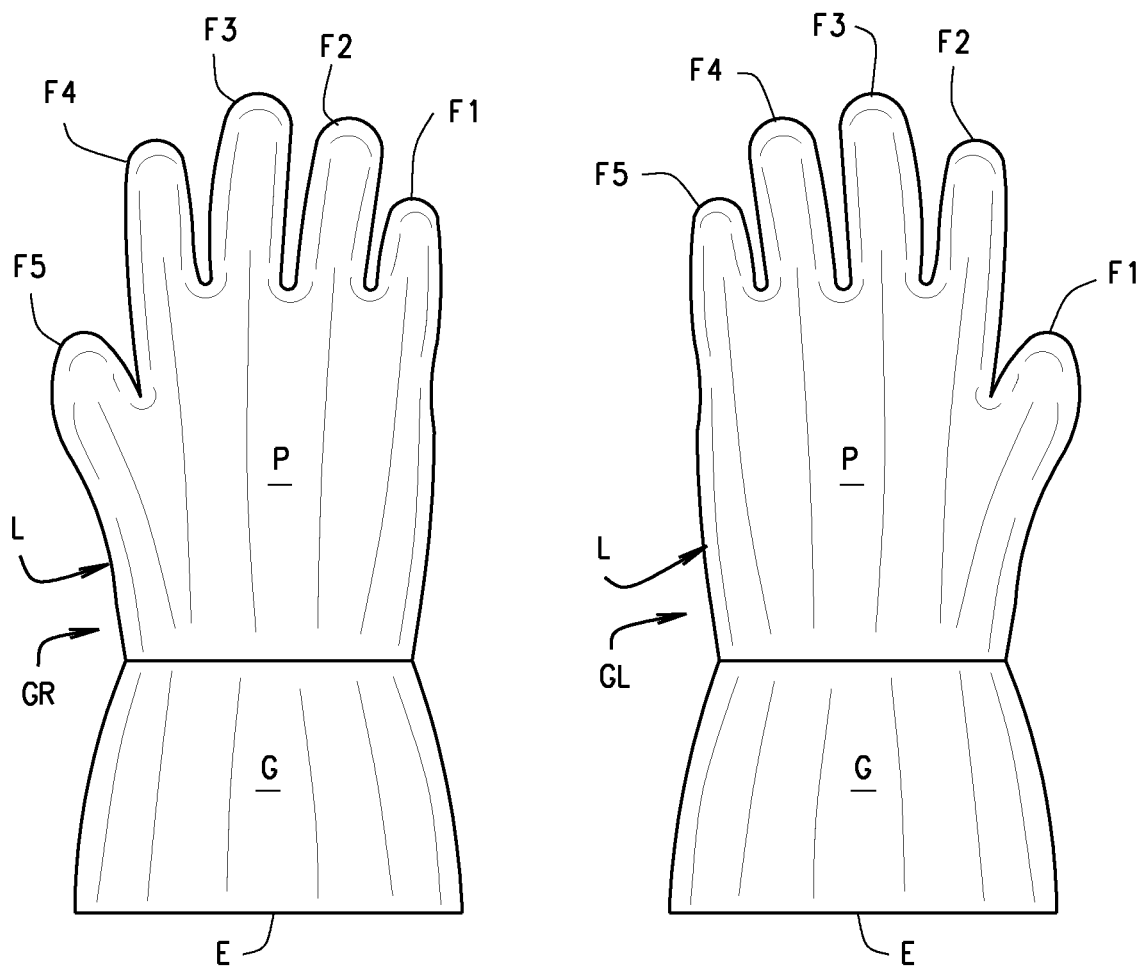
FIG. 1 is a plan view of right-hand and left-hand ergonomic scrub gloves of the present invention from the palm side of the respective gloves.
Figure 2:
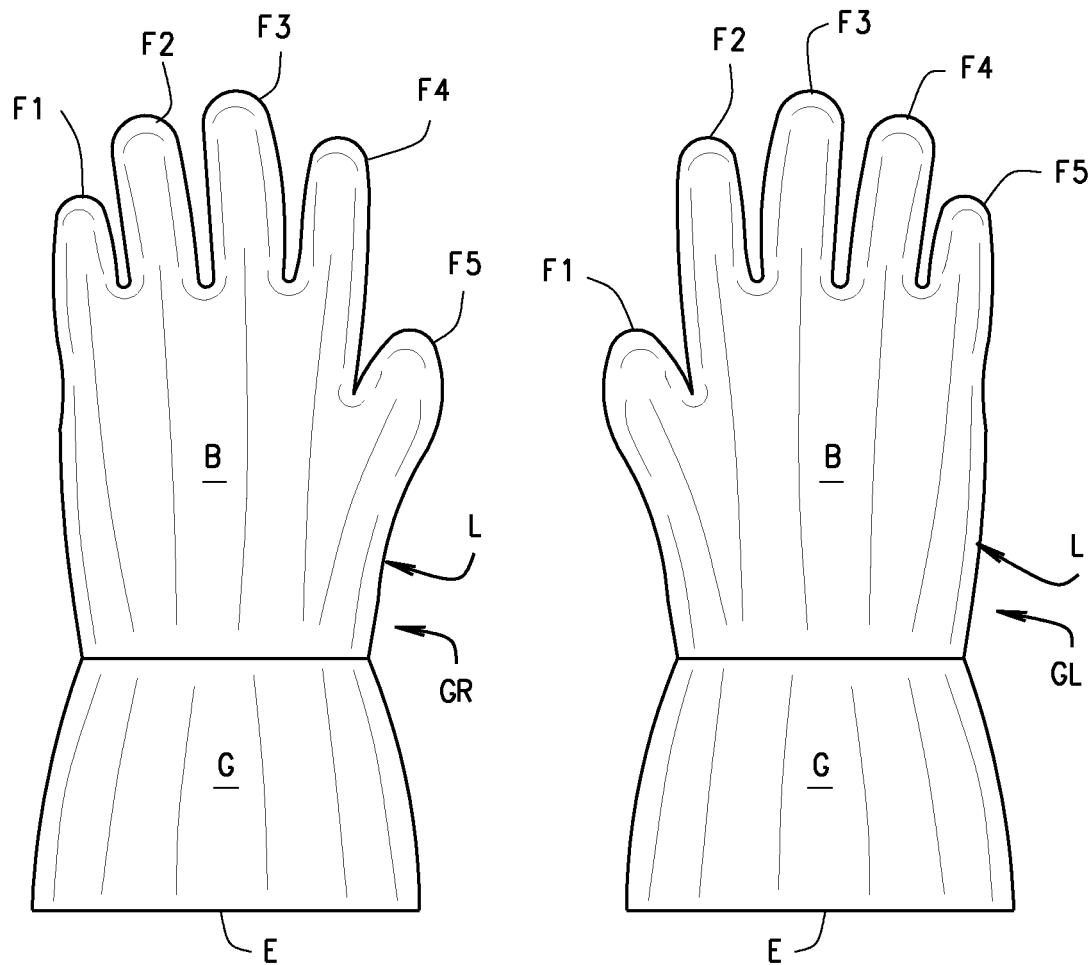
FIG. 2 is a plan view of the gloves from the back hand side thereof.
Figure 3:
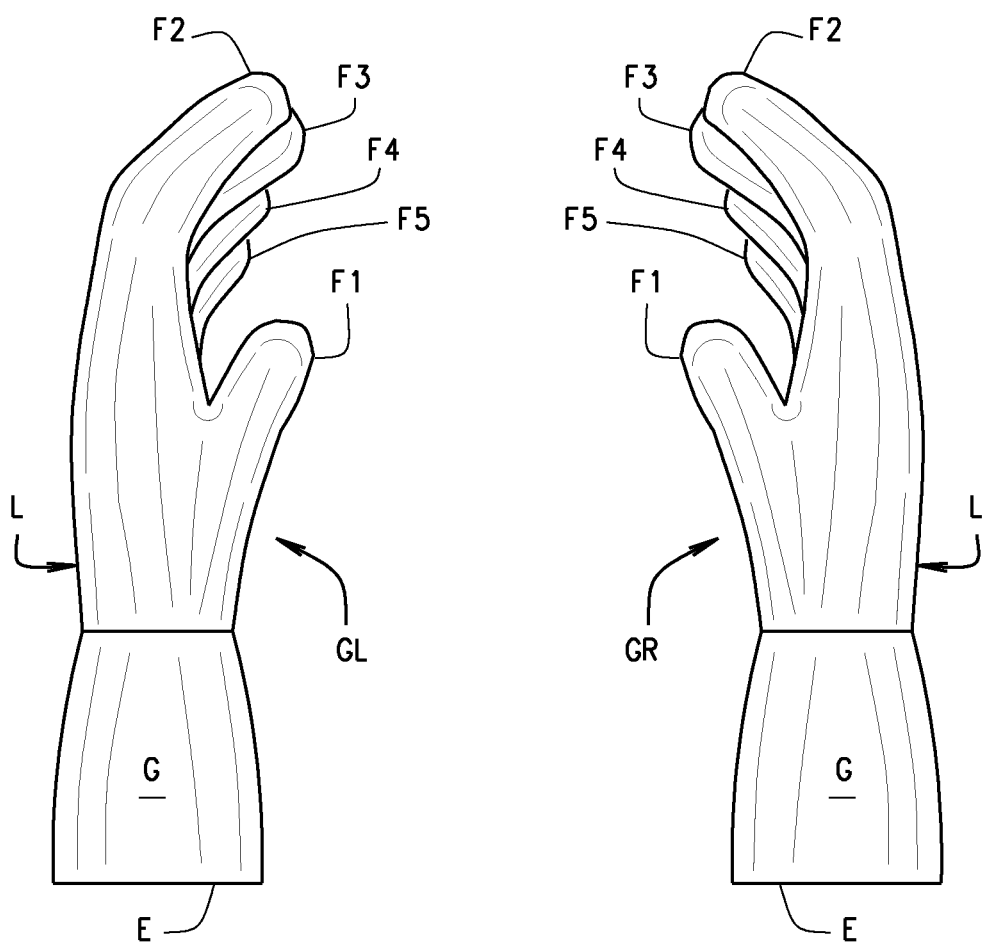
FIG. 3 is a side elevation view of the gloves from their respective thumb sides.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Referring to the drawings, a cleansing utensil G comprises an ergonomic scrub glove GR or GL for scrubbing various surfaces to thoroughly clean them. Gloves GR and GL are made of a rubber or other material impervious to liquid and each includes a thumb and fingers respectively designated F1-F5. Each scrub glove also has a palm portion P and backhand portion B. The glove is put on by the wearer in a conventional manner; and, when worn as shown in the drawings, an open, cuff end E of each glove extends up past the wearer's wrist and a portion of their forearm. This protects these portions of body from exposure to the cleansing agents with which a scrub glove is used.

Figure 4:
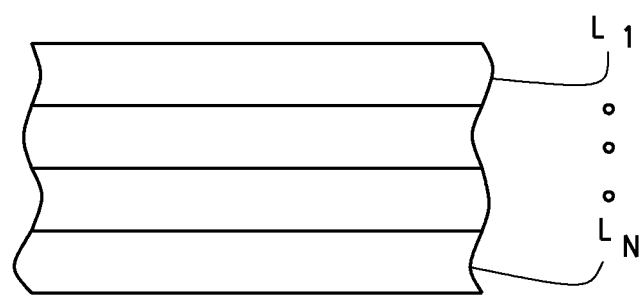
FIG. 4 is a partial sectional view of a multi-layer mesh material which is used to cover the glove.
Figure 7:
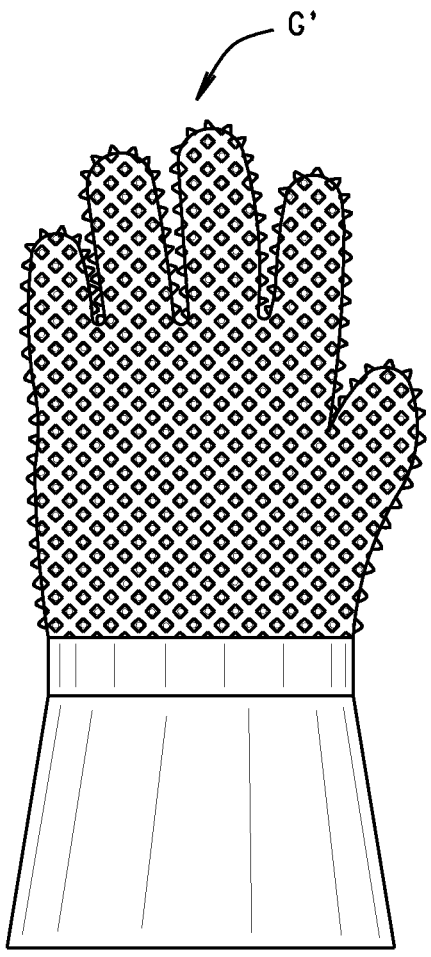
FIG. 7 is a plan view of the scrub glove viewed from the palm of the wearer's hand.
Figure 8:
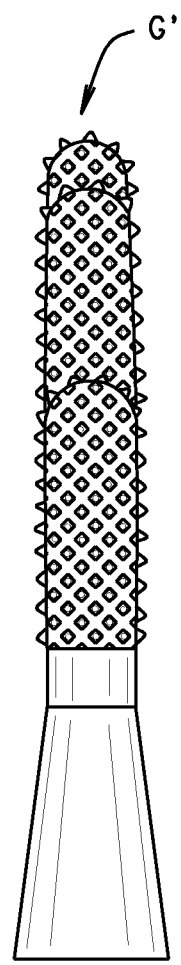
FIG. 8 is a side view of the scrub glove viewed from the thumb side of the wearer's hand.
Figure 9:
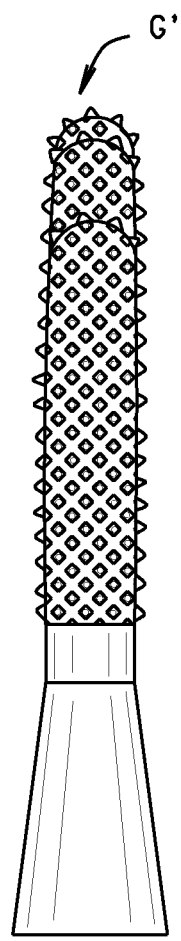
FIG. 9 is a side view of the scrub glove viewed from the little finger side of the wearer's hand.
Figure 10:
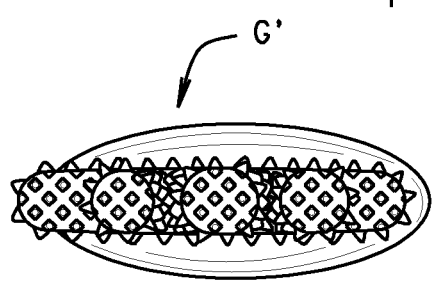
FIG. 10 is a front end view of the scrub glove.
Figure 11:
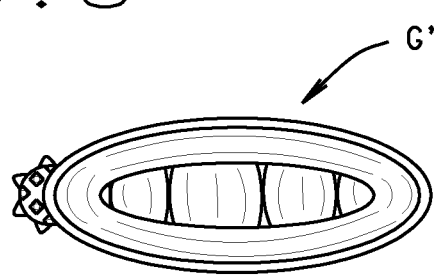
FIG. 11 is a rear end view of the scrub glove.

As further shown in the drawings, the fingers, palm, and backhand portion of glove G are covered and encased with a layer L of an abrasive woven mesh material. This material is, for example, a nylon material and the layer is attached to the fingers, palm and backhands portions of the glove by, for example, a flexible adhesive rubber compound material. Those skilled in the art will understand that the layer may be a unitary, one-piece layer of material formed to fit over the respective portions of scrub glove G; or, the layer may be applied in sections. That is, a separate portion of the layer is fitted over one or more of fingers F1-F5, another section of the layer over palm P and another section over backhand portion B of the glove. In another embodiment of the invention, as indicated in FIG. 4, a number of layers L1-Ln, each overlying the other, are applied to the exterior of the glove. A scrub glove with a multi-layer covering is used for more "heavy duty" cleaning operations.

In one embodiment of the invention, mesh layer L is non-detachable from the glove base but rather is bonded to the outer surface of the scrub glove by the compound used to attach it to the base. In another embodiment, layer L has a base which fits over the exterior of the glove and can be peeled off of the glove when worn with the base of a replacement layer then being fitted over the exterior of the glove. Typically this is done when the glove is either being worn by the user or fitted onto a fixture used for this purpose.

In use, scrub glove G is employed by the wearer as an ergonomic and flexible scrubbing utensil. An advantage of using the glove is that it easily conforms to the shape or contour of an object just as the wearer's hand would touch or grasp the item. This results in a better cleaning of objects and surfaces than trying to scrub them using a cloth or brush. Instead, the wearer generally employs a wiping motion over the surface of whatever is being cleaned to clean it. If there are grooves (such as, for example, where grout is routed between tiles) or depressions or recesses, the wearer uses the tip ends of the fingers to fit into and scrub these areas to clean them.

After use, the scrub glove is cleaned by rinsing it with a gentle soap solution either by hand, or by placing the glove in a dishwasher. In this regard, common, well-known over-the-counter household kitchen and bathroom cleaning solvents are used as cleaning agents on glove G. The scrub glove can also be air dried. In addition, when used to perform certain types of cleaning (as, for example, when a mold is encountered), the scrub glove is placed in a disinfectant solution as well as in a cleaning solution to clean it after use. Those skilled in the art will understand that, over time, use or damage to the scrub glove may necessitate its replacement.

Typically, the scrub glove is sold in pairs comprising a right hand glove GR and a left hand glove GL. Either or both gloves are worn during cleaning. While not shown in the drawings, it will be appreciated that the gloves are available in a variety of colors. Also, the scrub gloves are available in both a light duty (i.e., dusting) cleaning version and a heavy duty version. For the light duty version of the scrub glove, the covering layer L is of a cotton/nylon weave that is replaceable. In this version, a second layer for use in buffing is fitted over the first layer.

The varieties of uses of the scrub glove include, but are not limited to:
a) kitchen cleaning such as tile, grout, countertops, stoves, sinks, and floors;
b) bathroom cleaning such as tile, grout, bathtub and shower stall walls and floor, vanity or medicine cabinets mirrors and glass, toilets, and sinks;
c) upholstery, carpets, scuff marks on floors, etc. in other rooms of a house;
d) exterior cleaning of lawn furniture, cooking grills, siding, gutters, window frames and the windows; and,
e) automobile windshield, tires and tire rims, and the car's exterior to remove tar deposits, bug spatter, dirt, and grime.

Finally, it will be appreciated by those skilled in the art that scrub glove G provides an efficient, time saving, ergonomic solution to cleaning objects, and it is particularly helpful for persons suffering from arthritis or who have other movement limitations.

Figure 12A:
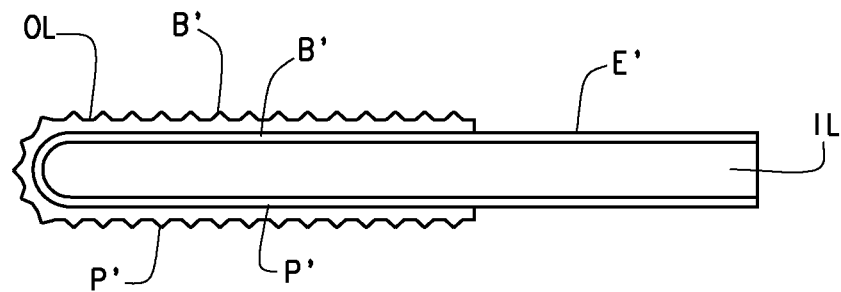
FIGS. 12A-12C respectively illustrate manufacture of this embodiment of the scrub glove.
Figure 12B:
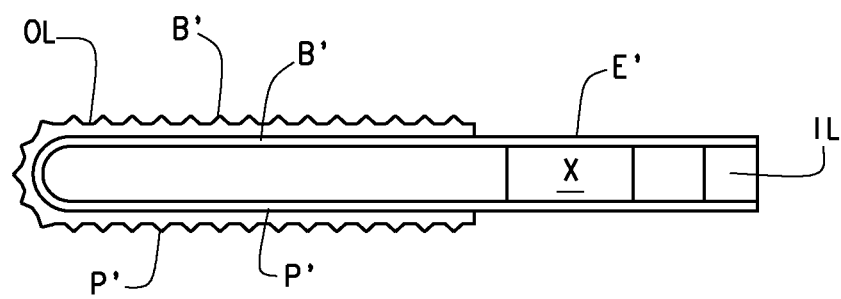
Figure 12C:
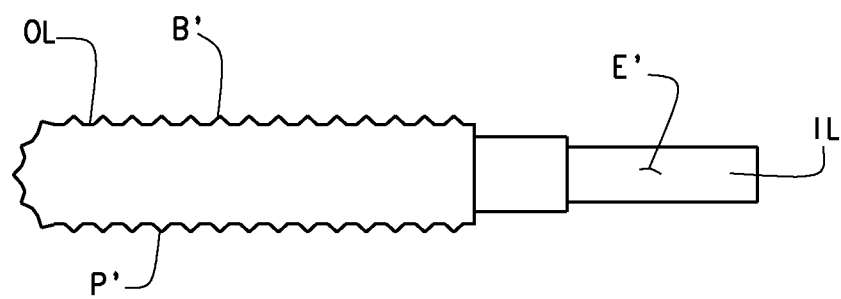

Referring to FIGS. 5-11, a second embodiment of the scrub glove is indicated generally G'. Glove G' is also an ergonomic scrub glove used for scrubbing various surfaces to thoroughly clean them. As shown in FIGS. 12A-12C, scrub glove G' comprises a first, inner layer IL made of rubber or other material impervious to liquids. Inner layer IL is formed to include a thumb and four fingers respectively designated F1'-F5', a palm portion P', backhand portion B' and an open, cuff end E' which extends up past a person's wrist and a lower portion of their forearm so to protect these body parts from exposure to cleansing agents with which a scrub glove G' is used.

Next, glove G' has a second, outer layer OL. Outer layer OL is shaped to fit over inner layer IL including the thumb, fingers, palm, and backhand portion of the wearer's hand, but it does not cover the wearer's wrist and forearm. Further, the outer surface of outer layer OL comprises an abrasive, woven mesh material. Both inner layer IL and outer layer OL are of one piece.

To form glove G', and as shown in FIG. 12B, the open, cuff end E' of inner layer IL is fitted onto a fixture X to which is connected to a source of air (not shown). After inner layer IL is fitted onto the fixture, the air is used to slightly inflate the inner layer. While so inflated, outer layer OL of the glove is fitted over the expanded inner layer. In doing so, the inner face of outer layer OL fits snuggly against the outer face of inner layer IL. However, the outer layer does not adhere to the inner layer. Accordingly, when the air pressure is removed from inner layer IL, the two layers IL and OL do not adhere to each other. Rather, when Glove G' is used for scrubbing, outer layer of glove G' is able to move separately and freely from the inner layer.

Next, a band D is fitted over the open end of outer layer OL where it fits over and completely around the cuff E' portion of layer IL. This is the area where the open end of the outer layer overlays the cuff portion of the inner layer, as shown in FIG. 12C. After band D is fitted in place, it is secured to both layers of glove G' by radio frequency (rF) heating. The result is that the outer inner layers OL and IL of glove G' are secured together such that they will not separate from each other despite the amount and type of cleaning use to which glove G' is subjected.

As with the precious embodiment of the invention, scrub glove G' is sold in pairs with either glove, or both gloves, being worn during cleaning.

In view of the above, it will be seen that the several objects and advantages of the present disclosure have been achieved and other advantageous results have been obtained.

Having thus described the invention, what is claimed and desired to be secured by Letters Patent is:

1. A scrub glove for use in cleaning, comprising:
    an inner layer of material impervious to liquids and formed to fit over, a wearer's thumb, fingers, palm, and back of their hand, said inner layer further including a portion extending over said wearer's wrist and forearm and including a cuff;
    an outer layer of an abrasive, woven mesh material formed to fit over said inner layer at said wearer's thumb, fingers, palm, and back of their hands; and
    a band fitting over and about an open end of said outer layer Where said open end is positioned over and about said cuff of said inner layer, said band extending completely about said open end of said outer layer and being secured to both said open end and said cuff such that said inner layer and said outer layer are secured together completely around said cuff;
    wherein said inner and outer lavers are only secured by said band so when said glove is used for cleaning, said outer layer of said glove moves separately from said inner layer; and
    wherein at least some of said portion extending over said wearer's wrist and forearm is not within said outer layer.

2. The scrub glove of claim 1 wherein the hand is secured in place by radio frequency (rF) heating.

3. The scrub glove of claim 1 in which the inner layer of the scrub glove is made of a rubber material.

4. The scrub glove of claim 1 which is available in pairs.

5. The scrub glove of claim 1 in which the inner layer is attached to a fixture connected to a source of air pressure and inflated prior to the outer layer being fitted over the inner layer.

* * * * *